March 8, 1932. G. K. HALBASCH 1,848,879
PHOTOGRAPHIC LENS SHADE
Filed Sept. 28, 1929
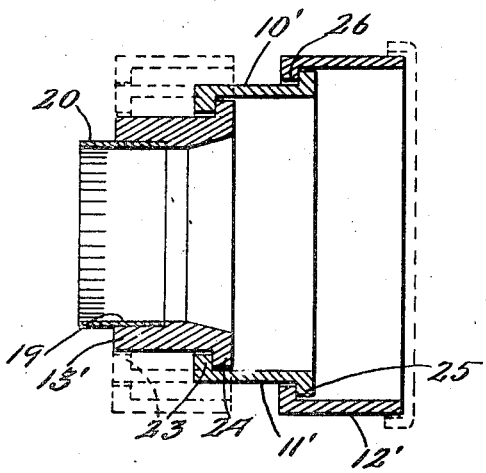
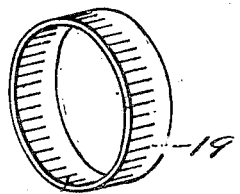
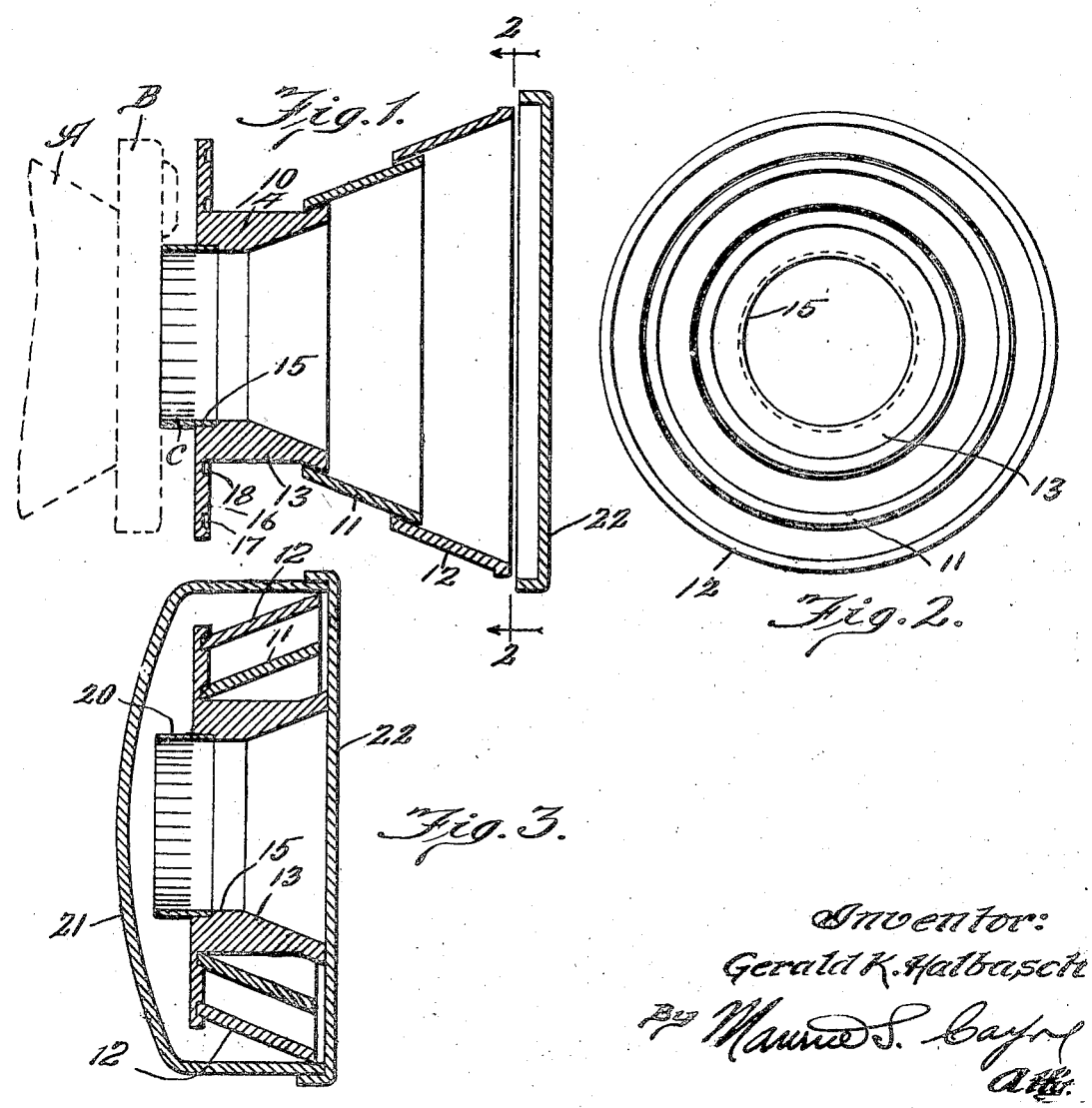
Inventor:
Gerald K. Halbasch Patented Mar. 8, 1932

1,848,379

UNITED STATES PATENT OFFICE

GERALD K. HALBASCH, OF CHICAGO, ILLINOIS

PHOTOGRAPHIC LENS SHADE

Application filed September 28, 1929. Serial No. 395,886.

This invention relates to means for excluding the unnecessary light which enters a photographic lens during exposure and is especially related to an adjustable and collapsible shield or hood adapted to be detachably secured on the lens mount for cutting off from the lens reflected light from adjacent objects, and to permit the direct light rays only striking the lens, whereby the formation of a halo or fog upon the negative plate is avoided, and a clearly defined impression is obtained upon said plate.

The main object of this invention is to provide a shield or hood for photographic lenses, which will be composed of few and simple parts which may be readily and easily constructed and assembled along lines convenient for low cost manufacturing, and which will be simple in operation and highly efficient in carrying out the purposes for which it is designed.

Another object of this invention is to provide a shield or hood of the character described, which is adapted for detachable engagement on the lens mount and is held in place thereon for excluding the unnecessary light from the lens during exposure, said hood being mounted on the camera without modifying or in any way altering the construction of the camera.

A further object of this invention is to provide a shield of the character described, which may be folded into compact form for convenience in carrying the same when not applied to a camera.

A still further object of the invention is to provide a device of the character described, comprising a shield adapted for excluding the unnecessary light which enters a photographic lens during exposure, said shield being constructed of a succession of tapered annular bands of suitable material, the said bands being so arranged that they can be pulled out when disposed over the lens tube to form a trumpet or cone.

A still further object of the invention is to provide for a photographic lens a collapsible detachable hood for excluding the unnecessary light from entering said lens during exposure. The said shield being constructed of a plurality of annular tapered bands, the inner one of which has secured thereto an annular ring of metal, or the like, which is cut or notched dividing it into a number of spring segments which allow the ring to be slightly expanded and form a spring clip for clamping over the outer edge of the lens mount for holding the hood in place thereon.

With the foregoing and other objects in view, which will appear as the description proceeds, the invention consists in certain novel features of construction, arrangements, and combination of parts, hereinafter more fully described, illustrated in the accompanying drawings, and particularly pointed out in the appended claim, it being understood that various changes in the form, proportion, size, material used, and minor details of the structure may be made without departing from the spirit of sacrificing any of the advantages of the invention.

Stated generally, the invention comprises a shield or hood consisting of a telescoping or collapsible set of bands of conical form, which when expanded form a trumpet shaped hood or cone. When collapsed the rings are adapted to lie the one within the other, occupying a very small space, whereby the same may be conveniently carried when not in use on the camera. The end ring, which is the smallest has attached thereto, in any suitable and well known manner, an annular ring a portion of which is adapted to project from said first-mentioned ring, said portion being cut or notched for dividing it into a number of spring segments which allow it to be slightly expanded and form a spring clip for clamping the device on the lens mount, so that when the shield is extended, the light required for formation of the image enters the lens unimpaired by the unnecessary light which may be reflected from adjacent objects and which is thereby cut off by the said hood or shield. When not in use on the camera the shield may be collapsed to compact form, there being provided suitable cap members for holding the same in this collapsed position, said cap members being arranged to fit over the outer members or the largest of said rings, and also over the inner or smaller ring.

For the purpose of facilitating an understanding of my invention, I have illustrated in the accompanying drawings, a preferred embodiment thereof, from an inspection of which, when considered in connection with the following description, my invention, its mode of construction, and many of its advantages should be readily understood and appreciated.

Referring to the drawings in which similar characters of reference are employed to indicate corresponding parts throughout the several figures of the drawings:

Fig. 1 is a side longitudinal sectional view of a shield embodying the present invention, the same being shown in extended form and attached to a camera of usual construction;

Fig. 2 is a view taken on lines 2—2 of Fig. 1;

Fig. 3 is a longitudinal sectional view of the shield showing the same in collapsed position;

Fig. 4 is a view in perspective of the notched ring for securing the shield on the lens mount; and Fig. 5 is a view in longitudinal cross-section of a modified form of the invention.

Referring to the drawings more specifically by characters of reference, the letter "A" designates a camera of any well known construction, having the front plate "B" and the lens tube "C" extending from the front of said plate "B". This forms no part of the present invention, and for that reason it is thought unnecessary to describe the same more in detail.

In order to efficiently shield the lens of the camera and to prevent the passage therethrough of reflected light from adjacent objects and to provide the shield or hood, generally designated by the reference character 10, said shield comprising the tapered telescoping annular bands 11 and 12, and the inner annular band 13, having the central opening 14 therein, which opening is of substantially the same size as the lens aperture of the camera. Although there are only two tapered sections shown in the drawings, it is to be understood that any desired number of annular bands may be used, the construction of these bands being the same, that is, of conical formation and the smaller diameter of the inner edge of one band being of such a size as to prevent the same from being extended over the larger edge of its inner band, whereby the possibility of the device being disassembled when in the extended position is eliminated. The said bands 11, 12, and 13, may be made or constructed of any suitable material such as, for example, hard rubber, bakelite, or the like, the inner surface thereof being provided with a dull finish and one that will not become polished or shiny by reason of the friction resulting from the collapsing and extending of the shield.

The inner band 13, is provided on the free edge thereof with an annular outwardly extending flange 16, having the circular grooves 17 and 18, provided therein, said grooves being adapted for receiving the inner edges of the bands 12 and 11, respectively, when the device is moved to collapsed form, as shown in Fig. 3 of the drawings. A flange 16, may be provided on the inner ring 13, in any suitable and well known manner such as by threading the same thereon, or it may even be formed integral therewith.

To the inner periphery of the inner ring 13, is rigidly secured in any well known manner an annular ring or band 19, of any suitable material, such as metal, or the like, said ring having a portion 20 thereof projecting from the outer face of the flange 16. This projecting portion of the ring is cut or notched along the circumference thereof for dividing it into a number of spring segments which permit the ring to be slightly expanded and form a spring clip adapted for clamping over the lens tube "C" and for holding the shield 10, in place on said tube. When the device is in fully assembled position the ring 20, is adapted to be sprung over the mount of the lens and the conical bands extended as shown in the drawings in Fig. 1, to form the trumpet shaped shield which is adapted to admit to the lens a clear cone of rays for the formation of the image and for cutting off only such light as would lie outside the image.

The specific means 19, shown for detachably securing the shield or hood to the camera is only one of many that may be employed for this purpose. Obviously, the hood 10, may be wholly or only partially extended as required, thereby providing the feature of adjustability thereto. A suitable cup shaped member 21, of any suitable material, may be provided for receiving and housing the shield when in collapsed position when not applied to the camera, said cup shaped member 21, being provided with a suitable cover or cap 22, for closing the same. It will thus be noted that a suitable container has been provided for holding the said shield when in collapsed position for conveniently carrying the same when not applied to a camera.

In Fig. 5 of the drawings is illustrated a modified form of shield, said shield being designated by the reference character 10', and being constructed of a plurality of telescoping cylindrical bands 11' and 12' as shown. The intermediate band 11', is provided on the inner end thereof with an inwardly extending annular flange 23, which is adapted to notch when in extended position with the outwardly extending annular flange 24, provided on the outer end of the ring 13'. The said ring 11' is also provided on the other end thereof with an outwardly extending annular flange 25, which is adapted for engagement with an inwardly extending annular flange 26, provided on the inner edge of the ring 12', whereby the said shield may be moved to fully extended position without the danger of disassembling the same. Said shield 10' is also provided with an annular ring 19 rigidly secured to the ring 13', said ring having a notched or cut portion 20, by means of which it may be sprung on the lens mount for detachably securing the shield thereto.

It will be noted that I have provided a shield or hood for use on cameras for excluding the unnecessary light from entering the lens thereof during exposure, said shield being cheaply constructed and assembled, easily attached to or removed from the camera, and capable of being folded into compact form for convenience in carrying when not applied to a camera.

It is believed that my invention, its mode of construction, and many of its advantages, should be readily understood from the foregoing, without further description, and should also be manifest that while preferred embodiments of the invention have been shown and described for illustrative purposes, the structural details are, nevertheless, capable of wide variation within the purview of my invention as defined in the appended claim.

What I claim and desire to secure by Letters Patent of the United States is:—

In a device of the character described comprising a series of telescoping bands adapted to form when in extended position a conical shield for the lens of a camera, the inner one of said bands having an annular flange on the inner end thereof, annular grooves provided on the outer face of said flange, said grooves being of a size and so disposed as to receive therein the inner edges of the other bands when the device is in collapsed condition, and an annular ring having one edge thereof rigidly secured within the inner band and the opposite edge of said ring being provided with a series of spaced notches around the periphery thereof whereby the same may be sprung over the lens tube for holding the device in operative position on the tube.

In testimony whereof, I affix my signature.

GERALD K. HALBASCH.